United States Patent
Tsuji

(10) Patent No.: US 10,488,907 B2
(45) Date of Patent: Nov. 26, 2019

(54) ELECTRONIC DEVICE AND METHOD FOR MANAGING POWER FAILURE OCCURRENCE

(71) Applicant: KABUSHIKI KAISHA TOSHIBA, Minato-ku, Tokyo (JP)

(72) Inventor: Tadashi Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 237 days.

(21) Appl. No.: 15/625,838

(22) Filed: Jun. 16, 2017

(65) Prior Publication Data

US 2017/0285715 A1    Oct. 5, 2017

Related U.S. Application Data

(63) Continuation of application No. PCT/JP2014/083665, filed on Dec. 19, 2014.

(51) Int. Cl.
| | |
|---|---|
| *G06F 1/26* | (2006.01) |
| *G06F 1/32* | (2019.01) |
| *G06F 1/30* | (2006.01) |
| *H04Q 9/00* | (2006.01) |
| *G06F 1/28* | (2006.01) |
| *H02J 9/06* | (2006.01) |

(52) U.S. Cl.
CPC .............. *G06F 1/30* (2013.01); *G06F 1/28* (2013.01); *H04Q 9/00* (2013.01); *H02J 9/062* (2013.01)

(58) Field of Classification Search
None
See application file for complete search history.

(56) References Cited

U.S. PATENT DOCUMENTS

| | | | | | |
|---|---|---|---|---|---|
| 4,987,363 | A | * | 1/1991 | Gibbs | G01R 21/1333 324/142 |
| 6,100,880 | A | * | 8/2000 | Thurig | H02J 7/35 345/211 |
| 6,629,248 | B1 | * | 9/2003 | Stachura | G06F 1/30 713/340 |

(Continued)

FOREIGN PATENT DOCUMENTS

| | | |
|---|---|---|
| JP | H06-181468 A | 6/1994 |
| JP | H9-54635 A | 2/1997 |

(Continued)

OTHER PUBLICATIONS

Extended European Search Report issued in European Patent Application No. 14908451.9 dated Jun. 25, 2018 in 9 pages.

(Continued)

*Primary Examiner* — Nitin C Patel
(74) *Attorney, Agent, or Firm* — Knobbe, Martens, Olson & Bear, LLP

(57) ABSTRACT

According to one embodiment, an electronic device operable by a power supply voltage obtained from a commercial power supply, includes a capacitor charged with the power supply voltage, and a circuitry configured to write power failure occurrence time information to a nonvolatile memory using power of the capacitor after occurrence of power failure, read the power failure occurrence time information from the nonvolatile memory, and transmit the power failure occurrence time information to an external device.

20 Claims, 6 Drawing Sheets

(56) References Cited

U.S. PATENT DOCUMENTS

| | | | |
|---|---|---|---|
| 6,665,620 B1* | 12/2003 | Burns | G01D 4/002 340/870.02 |
| 7,392,429 B2* | 6/2008 | Frank | G06F 1/30 714/22 |
| 7,504,821 B2* | 3/2009 | Shuey | G01R 22/00 324/142 |
| 8,994,214 B2* | 3/2015 | Apalenek | H02J 7/35 307/64 |
| 9,336,089 B2* | 5/2016 | Yuasa | G06F 11/1441 |
| 2007/0260918 A1 | 11/2007 | Okada et al. | |
| 2009/0196187 A1* | 8/2009 | Ooba | H04Q 9/02 370/242 |
| 2012/0192025 A1* | 7/2012 | Veillette | H04L 67/025 714/749 |
| 2012/0215969 A1 | 8/2012 | Tamura et al. | |
| 2013/0024041 A1* | 1/2013 | Golden | H02J 3/14 700/295 |
| 2015/0229130 A1 | 8/2015 | Yamane | |

FOREIGN PATENT DOCUMENTS

| | | |
|---|---|---|
| JP | 2000-232527 A | 8/2000 |
| JP | 2003-302290 A | 10/2003 |
| JP | 2008-293776 A | 12/2008 |
| JP | 2013-099026 A | 5/2013 |
| JP | 2014-033578 A | 2/2014 |
| WO | WO 2014/024456 A1 | 2/2014 |

OTHER PUBLICATIONS

International Search Report mailed by Japan Patent Office dated Feb. 24, 2015 in the corresponding PCT Application No. PCT/JP2014/083665.

* cited by examiner

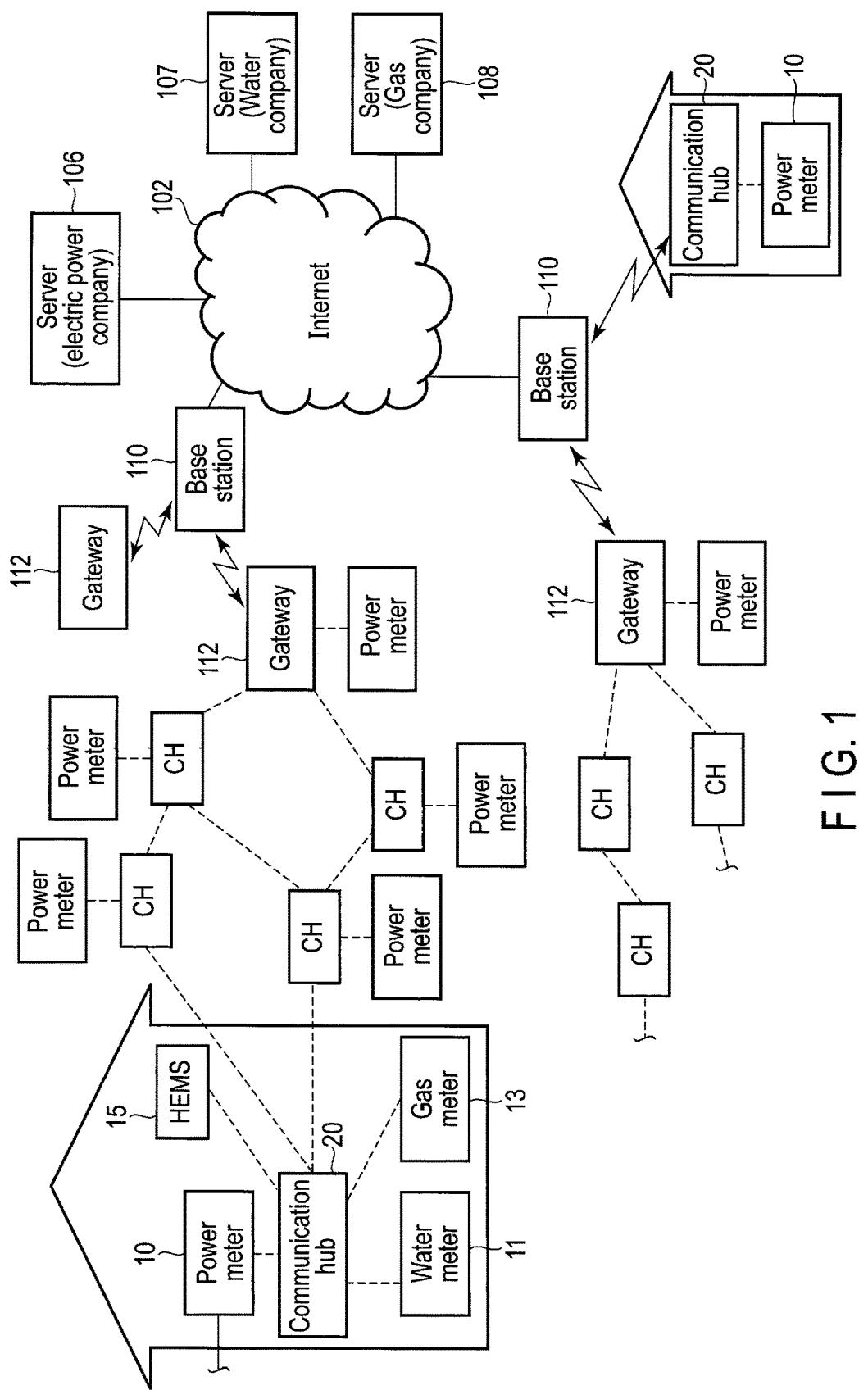
F I G. 1

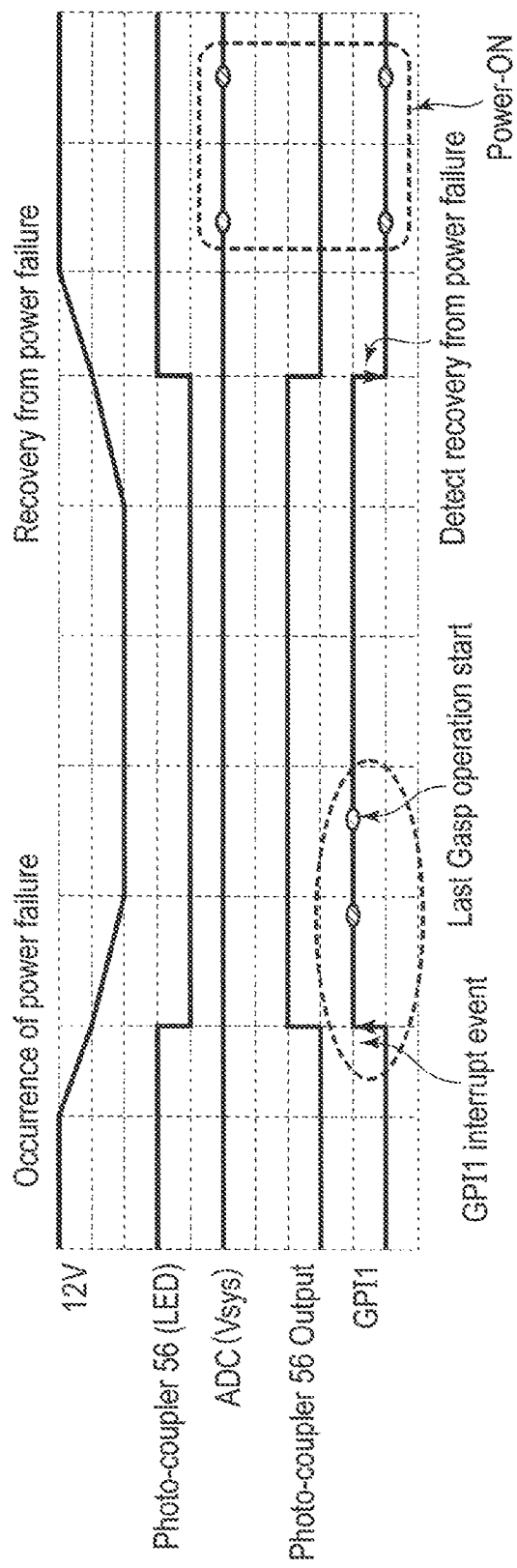
F I G. 3

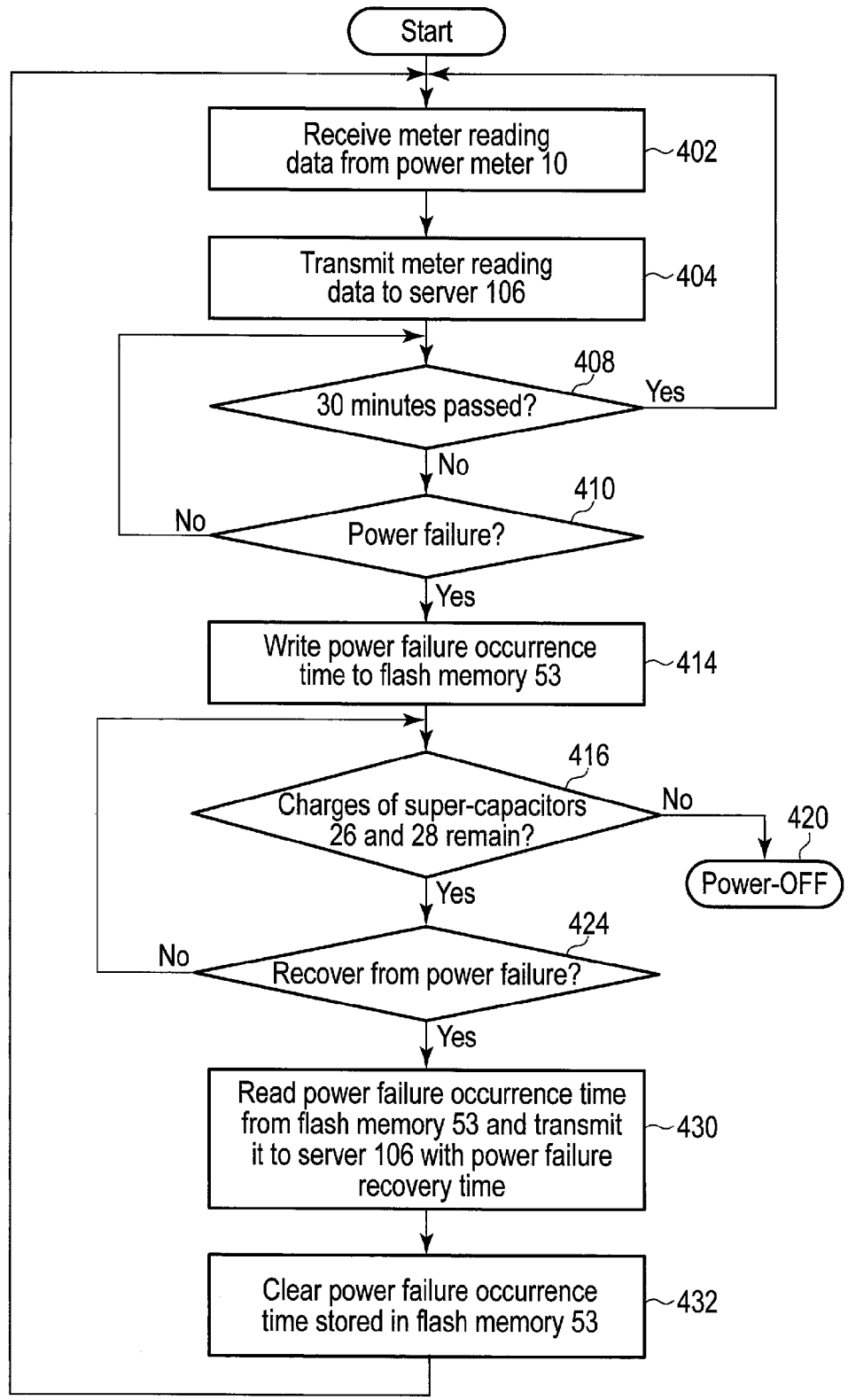
F I G. 4

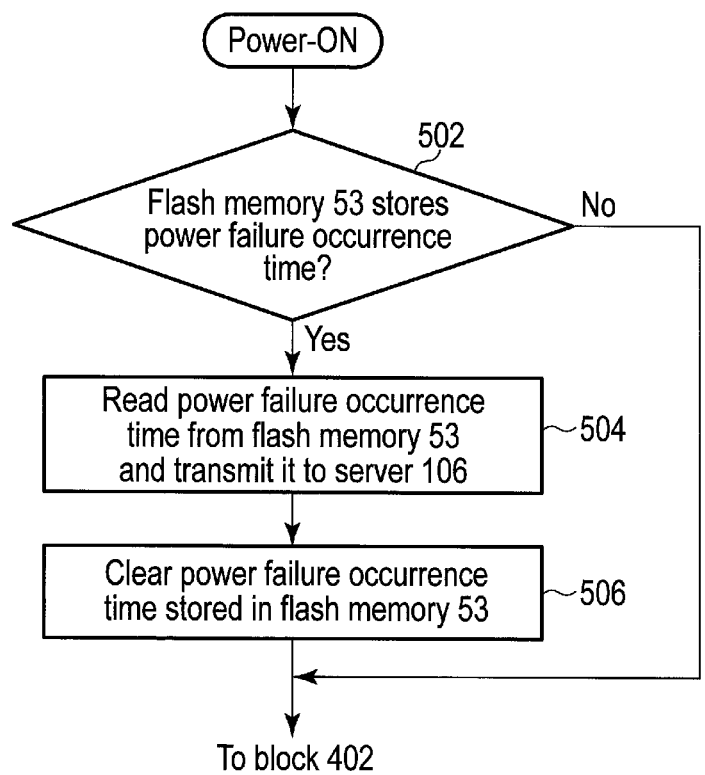
F I G. 5

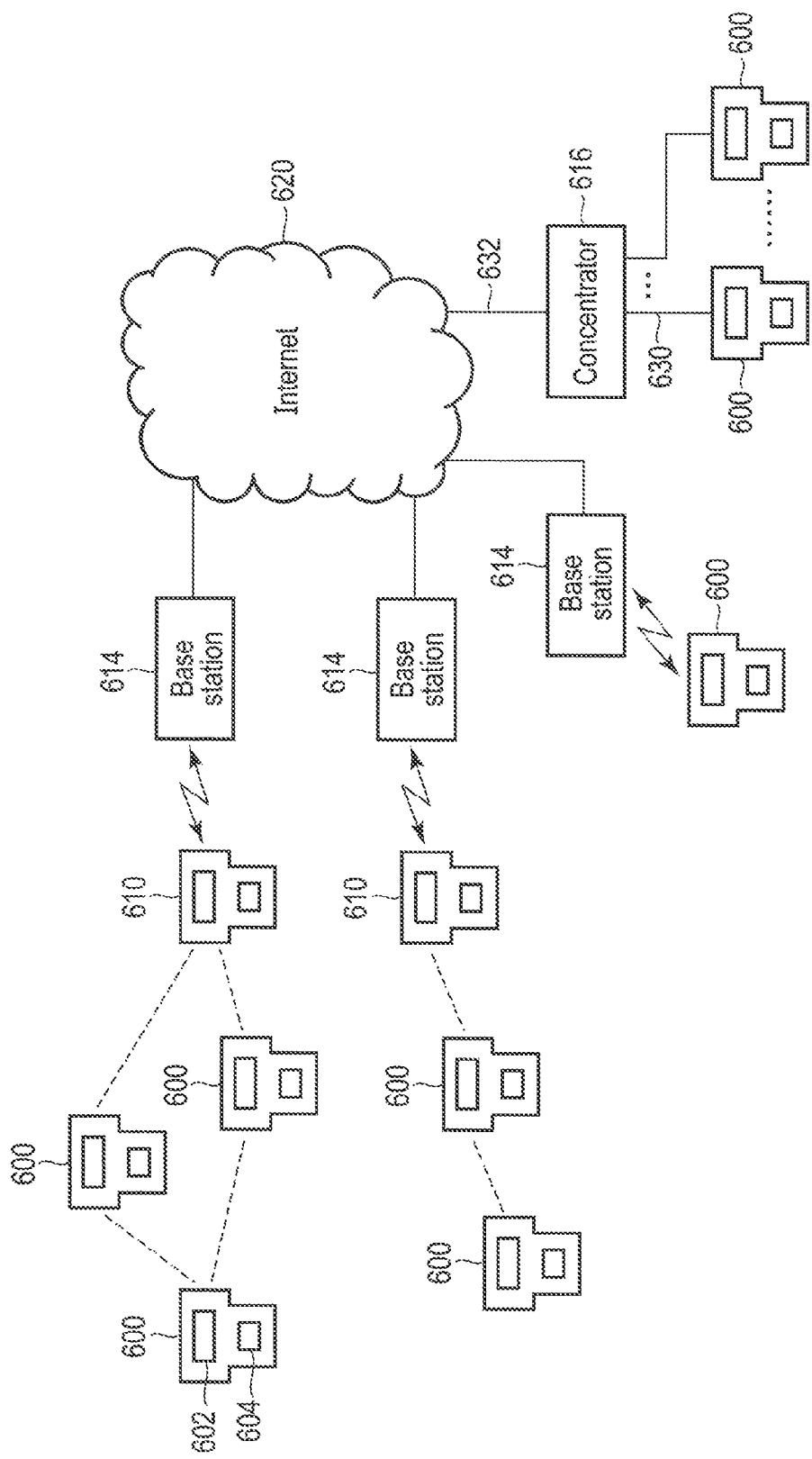
F I G. 6

ELECTRONIC DEVICE AND METHOD FOR MANAGING POWER FAILURE OCCURRENCE

CROSS-REFERENCE TO RELATED APPLICATIONS

This application is a Continuation Application of PCT Application No. PCT/JP2014/083665, filed Dec. 19, 2014, the entire contents of which are incorporated herein by reference.

FIELD

Embodiments described herein relate generally to an electronic device driven by a commercial power supply and having a communication function.

BACKGROUND

Examples of such an electronic device include a power meter, a gas meter, and a water meter having a communication function, which are called smart meters. Smart meters transmit the consumption of electric power, gas or water to the electric power companies, gas companies or water companies via networks. Servers send charges and the like to the smart meters. Furthermore, in order for the electric power companies to recognize the situation of occurrence of a power failure in a service area, the smart meters transmit power failure start time information and power failure recovery time information to the servers of the electric power companies. Since the smart meters is not equipped with batteries and are operated by the commercial power supply, the smart meters are not supplied with power and cannot conduct communication after a power failure occurs. To cope with this, the smart meter is provided with a large-capacity electric double-layer capacitor called a supercapacitor, charges the capacitor during operation with commercial power, and conducts communication using the power charged in the capacitor after occurrence of the power failure.

At occurrence of the power failure, however, since a large number of smart meters transmit the power failure occurrence time information to the server, each of the smart meters is considered to retry the communication many times due to communication errors. For this reason, some smart meters exhaust the charging power of the capacitors before completing the communication normally, and cannot notify the server of the power failure occurrence time information.

This problem may also arise at not only the smart meters, but also electronic devices which do not include batteries and are driven by a commercial power source and which need to notify external devices of the occurrence of a power failure.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an example of a situation in which an electronic device of an embodiment is connected to the network.

FIG. 3 is a signal waveform chart showing an example of detection of power failure occurrence and detection of power failure recovery of the electronic device of the embodiment.

FIG. 4 is a flowchart showing operations of the electronic device of the embodiment.

FIG. 5 is a flowchart showing an example of a subsequence to the flowchart shown in FIG. 4.

FIG. 6 is a block diagram showing an example of a situation in which the electronic device of a modified example is connected to the network.

DETAILED DESCRIPTION

Figure 2:
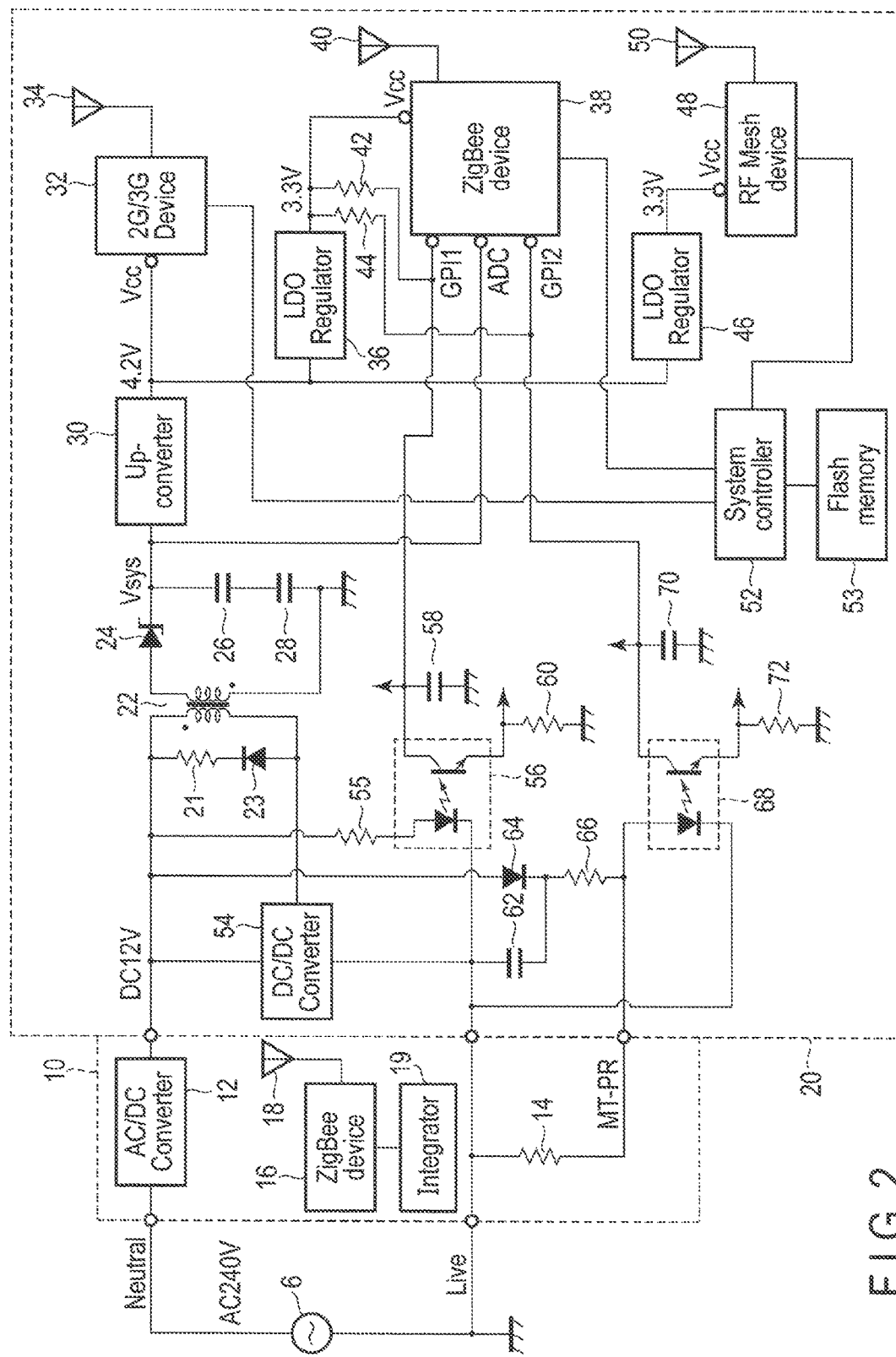
FIG. 2 is a circuit diagram showing an example of a circuit configuration of the electronic device of the embodiment.

Various embodiments will be described hereinafter with reference to the accompanying drawings.

In general, according to one embodiment, an electronic device operable by a power supply voltage obtained from a commercial power supply, includes a capacitor charged with the power supply voltage; and a circuitry configured to write power failure occurrence time information to a nonvolatile memory using power of the capacitor after occurrence of power failure, read the power failure occurrence time information from the nonvolatile memory, and transmit the power failure occurrence time information to an external device.

FIG. 1 is a block diagram showing an example of a situation in which the electronic device of the embodiment is connected to a network such as the Internet. A smart meter serving as a power meter equipped with a communication function will be explained as the embodiments, but the embodiments are not limited to this and can also be applied to an electronic device which is not equipped with a battery and is driven by a commercial power supply and which needs to notify an external device of the occurrence of power failure. In addition, an example in which a meter function and a communication function of the smart meter shown in FIG. 1 are accommodated in separate units, and both the units are firmly coupled with each other at shipment from factories or coupled with each other so as to be capable of being detached by a user will be explained, but the both functions may be accommodated in an integral unit. Both the units are detachably coupled for convenience of replacement of the communication function itself in case of breakdown.

A power meter 10 is connected to a lead-in wire of a commercial power supply to the home. Meter reading data of the power meter 10 is transmitted to a communication hub (CH) 20 by wireless communication. Other meters in the home, for example, a water meter 11 and a gas meter 13 also wirelessly transmit the meter reading data to the communication hub 20. A home energy management system (HEMS) may be connected to the communication hub 20. The communication hub 20 transmits the meter reading data received from the respective meters to servers of the electric power company, the water company or the gas company via the Internet 102. In an urban area where houses are located densely, a wireless multi-hop system defined by IEEE 802.15.4 standard is adopted as a system for communication from the communication hub to the network. The wireless multi-hop system transmits data to a communication hub called gateway 112 by sequentially processing multi-hop of other communication hubs capable of establishing communication. The gateway 112 is connected to the Internet 102. Thus, smart meters are connected to one smart meter (gateway) in a mesh-like network, a communication hub capable of establishing communication is selected, and a route to the gateway is determined each time. The gateway 112 is connected to a wireless base station 110 via the 2G/3G cellular telephone line. The base station 110 is connected to the electric power company, water company, or gas company servers 106, 107, and 108 via the Internet 102.

The communication hub 20 in a range where radio waves of the base station 110 reach may be directly connected to the base station 110 through a 2G/3G cellular telephone line. Furthermore, the communication with the network is not limited to wireless communication, but may be communication using a power line. The communication using the power line is mainly used in condominiums, buildings and the like.

Since the communication hub 20 is thus connected to the power meter 10 of each house, when the power meter 10 detects the occurrence of power failure and notifies the server 106 of the occurrence, the electric power company can timely recognize in which area the power failure occurred based on the recognition as to which power meter 10 lost the power. For this reason, the power meter 10 is configured to report occurrence of a power failure to the server 106 upon detection of the occurrence of power failure. However, the communication hub 20 cannot be equipped with a battery since the power meter 10 and the communication hub 20 are installed outdoors. To supply the power for conducting communication on the information with the server 106 at the power failure, the communication hub 20 includes a large-capacitance capacitor, uses the power stored in the capacitor, and performs a response to the occurrence of power failure.

FIG. 2 is a circuit diagram showing an example of a circuit configuration of the electronic device of the embodiments. A general commercial power supply (for example, AC 200V or 100V in Japan and 240V in the United Kingdom) 6 is applied to the power meter 10. A power line of the commercial power supply 6 includes, for example, a neutral line of AC 240V and a non-insulated live line of the ground level.

The power meter 10 includes an AC/DC converter 12, a pull-down resistor 14 for tamper detection, a ZigBee device 16, an antenna 18, an integrator 19 and the like. An AC voltage is supplied from the neutral line to the AC/DC converter 12, and the AC voltage is converted into a DC voltage (for example, DC 12V) and supplied to the communication hub 20 via a connector as the power. The live line is connected to a ground line of the communication hub 20 through the power meter 10. A tamper detection terminal MT_PR is provided at a connector between the power meter 10 and the communication hub 20, besides a DC 12V terminal and a live line terminal. The tamper detection terminal MT_RR of the communication hub 20 is connected to the live line via the pull-down resistor 14 (for example, 10Ω), inside the power meter 10.

A home interconnect connected to electric devices (not shown) is connected to the power meter 10 and an integrated value of power consumption of the electric devices is obtained by the integrator 19. An integrated power is wirelessly transmitted to the communication hub 20 using the ZigBee device 16 and the antenna 18. The communication hub 20 is attached to the power meter 10 and is supplied with the power supply voltage from the power meter 10 via the connector, but the meter reading data (integrated power) of the power meter 10 is not transmitted to the communication hub 20 via the connector but is transmitted from the power meter 10 to the communication hub 20 by wireless communication of the ZigBee standard. However, the transmission is not limited to the above structure, but the meter reading data of the power meter 10 may be transmitted to the communication hub 20 (system controller 52 to be explained later) in a cable via the connector.

It should be noted that, for example, gas consumption data from the gas meter 13, and water consumption data from the water meter 11, other than the power meter in the home, are also transmitted from ZigBee devices in the respective meters, to the communication hub 20, and received via an antenna 40 and a ZigBee device 38. In other words, the communication hub 20 can wirelessly aggregate the meter reading data from not only the power meter 10, but also the various meters and transmit the data to the network side periodically (for example, at intervals of thirty minutes).

The DC voltage of, for example, 12V supplied from the power meter 10 to the communication hub 20 is transformed via the transformer 22, and is output via a diode 24 as Vsys voltage of, for example, 4.2V. Both ends of primary winding of the transformer 22 are connected to each other via a resistor 21 and a diode 23. A DC/DC converter 54 is also connected to the primary side of the transformer 22 and the DC 12V is also supplied to the DC/DC converter 54. Both ends of secondary winding of the transformer 22 are connected to each other via electric double-layer capacitors 26 and 28 (hereinafter referred to as super-capacitors) in series and the output voltage Vsys of the transformer 22 charges the large-capacity super-capacitors 26 and 28. One of ends of the super-capacitor 26 is connected to a diode 24 and one of ends of the super-capacitor 28 is grounded. For example, each of the super-capacitors 26 and 28 has the capacity of 25 F and the capacity of the super-capacitors 26 and 28 connected in series is 12.5 F. This capacity is set at a value at which, even if the supply of DC 12V to the communication hub 20 is cut off by the occurrence of power failure or the like, the output voltage Vsys of the transformer 22 can be kept for a certain period and the communication hub 20 can be operated for a short time after the occurrence of power failure.

The communication hub 20 includes a plurality of, for example, three wireless communication device, for example, a 2G/3G device 32, the ZigBee device 38 and an RF mesh device (a mesh network of IEEE 802.15.4) 48. Of these devices, the ZigBee device 38 is configured to receive the meter reading data from various meters, and the 2G/3G device 32 and the RF mesh device 48 are configured to transmit the meter reading data received from the various meters to the network side. The 2G/3G device 32 is configured to conduct communication using a cellular telephone line and is mainly employed in a suburb and a region in which houses are not located densely. The RF mesh device 48 is configured to conduct multi-hop communication between the meters (communication hub 20) and is mainly employed in the urban area where houses are located densely. The communication with the network is not limited to wireless communication but may be communication using a power line. The communication using the power line is mainly used in condominiums, buildings and the like. A device used for communication with the network is selected in accordance with the installation environment of the communication hub.

An operating voltage of the 2G/3G device 32 is in a range of 3.4V to 4.2V (Typ: standard voltage is 3.8V) but the operating voltage of the ZigBee device 38 and the RF mesh device 48 is 3.3V (Typ). Since the voltage of the super-capacitor is reduced from 4.2V when DC 12V is cut off by the occurrence of power failure or the like, the output Vsys of the transformer 22 is boosted to, for example, DC 4.2V, via an up-converter 30 and supplied to the power supply terminal Vcc of the 2G/3G device 32. The 2G/3G device 32 can transmit the meter reading data to, for example, the server of the electric power company by conducting communication with a base station of cellular telephone communication via an antenna 34 even after the occurrence of power failure.

The output Vsys of the transformer 22 is transformed to 3.3V via an LDO (Low Drop Out) regulator 36 and supplied to a power supply terminal Vcc of the ZigBee device 38. The ZigBee device 38 receives the meter reading data from various meters by conducting communication with various meters via the antenna 40. In addition, the RF mesh device 48 transmits the received meter reading data to the gateway via an antenna 50 by way of (by hopping) an RF mesh device of the other communication hub 20.

The output Vsys of the transformer 22 is transformed to 3.3V via an LDO regulator 46 and supplied to a power supply terminal Vcc of the RF mesh device 48. The RF mesh device 48 forms a wireless mesh network with the other communication hub 20 via the antenna 50 and transmits the meter reading data to the gateway.

A system controller 52 is connected to the 2G/3G device 32, the ZigBee device 38 and the RF mesh device 48 and transmission and reception of the meter reading data is thereby controlled. For example, the meter reading data received from various meters by the ZigBee device 38 is transmitted from the 2G/3G device 32 or the RF mesh device 48 to the network side under control of the system controller 52. A flash memory 53 is connected to the controller 52, and the identification information of the communication hub 20, the meter reading data received from the other meters, and the power failure occurrence time information are written to the flash memory 53.

The communication hub 20 is designed to be operated for thirty seconds from start of the occurrence of power failure and notify the network of the occurrence of the power failure during this period. For this reason, the capacities of the super-capacitors 26 and 28 are determined such that Vsys can be maintained for thirty seconds even if the supply of DC 12V from the power meter 10 is cut off. During thirty seconds, the communication hub 20 can perform Last Gasp operation and notify the network side of the occurrence of power failure by using the 2G/3G device 32 or the RF mesh device 48. The network side is expected to take an appropriate measure when the network side is notified of the occurrence of power failure. After the network side is notified of the occurrence of power failure, the communication hub 20 may stop the operation. Since the power failure occurs in an area and since a number of communication hubs 20 in the area simultaneously transmit the information to the network during the power failure, the network is congested and retry is required. Retry is permitted up to three times and thirty seconds are required for three retries. In a large-scale power failure or the like, however, the communication hubs may not be able to be connected to the network in thirty seconds or less and may not able to notify the network of the occurrence of power failure. In the present embodiments, the power failure occurrence time information is written to the flash memory 53 and the server 106 is notified of the power failure occurrence time information read from the flash memory 53 later.

Since the server 106 does not need to be notified of the power failure occurrence time information at the occurrence of power failure, the power failure occurrence time information is only written to the flash memory 53 and the server 106 is not notified of the information at the occurrence of a power failure, in the present embodiments. The server 106 is notified of the information when the stable operation is assured after the recovery from power failure. The server 106 can be thereby certainly notified of the power failure occurrence time information. Since writing to the flash memory 53 can be performed with small power, writing can be sufficiently performed by the power of the super-capacitors 26 and 28 even after the occurrence of power failure.

Since power failure detection can be performed by utilizing the variation in the power supply voltage supplied from the power meter 10, the power failure detection is performed by any one of the communication devices. An example of performing the detection of power failure by the ZigBee device 38 will be explained here. By modifying the other communication devices similarly, the detection can be performed by the other devices. The ZigBee device 38 includes a GPI1 terminal and an ADC terminal for the detection of power failure.

Since the voltage from the power meter 10 is a non-insulated voltage, a circuit for implementing the above-explained detecting function of the communication hub 20 is desired to be insulated from the power meter 10. For this reason, the output Vsys of the transformer 22 is connected to the ADC terminal of the ZigBee device 38, DC 12V supplied from the power meter 10 is connected to the GPI1 terminal of the ZigBee device 38 via a photo-coupler 56. The ZigBee device 38 is thereby insulated from the commercial power supply.

An LED of the photo-coupler 56 has an anode connected to the DC 12V line via a resistor 55 and a cathode connected to the live line. A collector of a phototransistor of the photo-coupler 56 is connected to the GPI1 terminal and is grounded via a capacitor 58. An emitter of the phototransistor 56 of the photo-coupler 56 is grounded via a resistor 60. The GPI1 terminal is connected to an output voltage 3.3V of the LDO regulators 36 via a resistor 42.

Thus, DC 12C on the primary side is inverted by the photo-coupler 56 and transmitted to the secondary side and its variation is detected by the GPI1 terminal. At this time, the super-capacitors 26 and 28 are connected to the secondary side of the transformer 22 and, even if the supply of the power (DC 12V) is interrupted, the output voltage Vsys of the transformer 22 is maintained for a certain period, and the ZigBee device 38 can continue the operation during the period and detect the change of the GPI1 terminal from Low to High.

FIG. 3 is a timing chart showing an operation of detecting the occurrence of a power failure and the recovery from power failure. The power failure and the recovery from power failure are detected by using electric charge of the super-capacitors 26 and 28 on the secondary side of the transformer 22, but the charge capacity is gradually reduced immediately after the occurrence of power failure. Since a capacity is connected to an output terminal in the power meter 10, the voltage of DC12V line in the communication hub 20 is gradually decreased as shown in FIG. 3 when a power failure occurs. When the voltage falls below a threshold value, the photo-coupler 56 is turned off and an LED stops lighting. For this reason, the output of the photo-coupler 56 changes from Low to High and the GPI1 terminal changes from Low to High. If the GPI1 terminal changes from Low to High, the ZigBee device 38 detects an interruption, then monitors a state of the GPI1 terminal for a predetermined period, for example, every one second and, if High is detected two times, ZigBee device 38 starts Last Gasp operation of notifying the network side of the detection of power failure. More specifically, the ZigBee device 38 notifies the system controller 52 of the detection of power failure. The system controller 52 writes the power failure occurrence time information to the flash memory 53 and notifies the server 106 of the electric power company on the network side of the detection of power failure by using the 2G/3G device 32 or the RF mesh device 48. The electric power company receiving this can start a recovery work and reduce the time for the recovery from power failure.

It should be noted that a power failure is not detected immediately based on the change of the GPI1 terminal (Low to High) to reduce the possibility of detection error based on an unstable operation. For this reason, if the operation is stable, a power failure may be detected immediately by interrupt detection. In addition, if a power failure is not detected immediately by an interrupt detection, the number of times of detection of High is not limited to two times, but may be one time or three times or more, and the detection interval is not limited to one second but may be an arbitrary interval (including an inconstant interval).

If the power is recovered from a power failure and the DC 12V line rises to the threshold value or more, the photo-coupler 56 is turned on, its output becomes Low, and the GPI1 terminal is changed from High to Low. When the GPI1 terminal changes from High to Low, the ZigBee device 38 detects the interruption, then monitors the state of the GPI1 terminal and the state of the ADC terminal supplied with Vsys for a predetermined period, for example, every one and half seconds. If monitoring GPI1=Low and ADC=High (where Vsys maintains High until the recovery from power failure by charges of the super-capacitors 26 and 28) appears two times, the ZigBee device 38 notifies the network side of power-on to inform the recovery from power failure. This recovery detection may also be detected immediately by interrupt, similarly to the power failure detection and, if the recovery is detected at a plurality of times, the number of times of the detection and the like can be varied appropriately.

FIG. 4 is a flowchart showing an example of operations of the communication hub 20 of the embodiments. In block 402, the ZigBee device 38 receives the meter reading data transmitted from various meters and received by the antenna 40. The received data is written to the flash memory 53 by the system controller 52. The meter reading data from the electric energy meter 10 will be explained for convenience of explanations but the meter reading data from the other meters 11 and 13 are also processed in the same manner. In block 404, the system controller 52 reads from the flash memory 53 the meter reading data received by the ZigBee device 38 and causes the RF mesh device 48 to transmit the data from the antenna 50. Data transmitted from the antenna 50 of a communication hub is received by the RF mesh device 48 of another communication hub in the surroundings and is further transmitted from the RF mesh device 48 of the other communication hub in the surroundings to a still another communication hub in the surroundings. This is repeated and the meter reading data is transmitted to the communication hub 20 which acts as the gateway 112. For this reason, if an intermediate communication hub is unable to conduct communication due to a power failure or the like, the communication hub is skipped, a communication hub capable of communication is selected and used and the meter reading data is multi-hopped to the gateway 112. The gateway 112 is connected to the base station 110 via the 2G/3G cellular telephone line and the base station 110 is connected to the server 106 of the electric power company through the Internet 102. The meter reading data of each communication hub 20 is thus uploaded to the server 106. The meter reading data is accompanied with identification information of the communication hub.

In block 408, the system controller 52 determines whether thirty minutes have passed since transmission of the meter reading data or not. If not, the system controller 52 determines whether the ZigBee device 38 detects a power failure based on the voltage of the GPI1 terminal or not, in block 410. If not, the elapsed time check of block 408 is continued. If thirty minutes have passed, the processing returns to block 402 and the reception and transmission of the meter reading data are performed. The meter reading data is thereby transmitted from the power meter 10 to the server 106 via the communication hub 20, the gateway 112, the base station 110, and the Internet 102 every thirty minutes.

If the ZigBee device 38 detects the occurrence of power failure in block 410, the system controller 52 writes the power failure occurrence time information to the flash memory 53 in block 414. As explained with reference to FIG. 3, since the GPI1 terminal changes from Low to High when a power failure occurs, the ZigBee device 38 then monitors the state of the GPI1 terminal for a predetermined time, for example, every one second. When High is detected two times, the ZigBee device 38 detects the occurrence of power failure. Since both ends of the secondary winding of the transformer 22 are connected to each other via the large-capacity super-capacitors 26 and 28 in series in the communication hub 20, the super-capacitors 26 and 28 are charged with the output voltage Vsys of the transformer 22. For this reason, even if a power failure occurs, the output voltage Vsys of the transformer 22 is maintained for a while by the charges of the super-capacitors 26 and 28. The power failure occurrence time information is thereby certainly written to the flash memory 53.

Next, it is determined whether the charges of the super-capacitors 26 and 28 remain or not, in block 416. The charges of the super-capacitors 26 and 28 reduce as the time passes and, when the time passes to some extent, the communication hub 20 becomes unable to perform the operation. If no charges remain, at block 420, the power of the communication hub 20 is completely lost and becomes in the power-off state in block 420. If the charges of the super-capacitors 26 and 28 remain, the system controller 52 determines whether the ZigBee device 38 has detected the recovery from power failure based on the voltage of the GPI1 terminal or not, in block 424. If not, the processing returns to block 416. As explained with reference to FIG. 3, since the GPI1 terminal changes from High to Low when the power is recovered, the ZigBee device 38 then monitors the state of the GPI1 terminal and the state of the ADC terminal supplied with Vsys for a predetermined time, for example, every one and a half seconds. If monitoring GPI1=Low and ADC=High appears two times, the ZigBee device 38 detects the recovery from power failure.

If the recovery from power failure is detected, the system controller 52 reads the power failure occurrence time information from the flash memory 53, hops other communication hubs using the RF mesh device 48, and uploads the power failure occurrence time information to the server 106 together with the power failure recovery time information, in block 430. The power failure occurrence time information is accompanied with the identification information of the communication hub. The system controller 52 clears the power failure occurrence time information in the flash memory 53 in block 432 and the processing returns to block 402. Since the situation of the occurrence of power failure is also recorded on the communication hub 20 side, block 432 may be omitted. The power failure occurrence time information may be accumulated in the flash memory 53, and the latest power failure occurrence time information alone may be reported to the server.

Thus, even if supply of the DC 12V from the power meter 10 to the communication hub 20 is interrupted for a while after the occurrence of power failure, the communication hub 20 continues operation with the charges of the super-capacitors 26 and 28. In this period, the power failure occurrence time information is certainly written to the flash memory 53. Since the flash memory 53 is a nonvolatile memory, the power failure occurrence time information is stored even if no charges of the super-capacitors 26 and 28 remain and the power of the communication hub 20 is turned off. For this reason, when the power is recovered after that, the server can certainly collect the power failure occurrence time information by reading the power failure occurrence time information from the flash memory 53 and transmitting the information to the server 106.

FIG. 5 is a flowchart showing an example of a subsequence to the flowchart shown in FIG. 4. The power of the communication hub 20 is turned on at any time and is not turned off except when a power failure occurs. Furthermore, as shown in FIG. 4, if a power failure is recovered while the charges of the super-capacitors 26 and 28 remain after the occurrence of a power failure, the power is not turned off and the operations in FIG. 4 are repeated. If the power failure is recovered or the power is turned on by some reason after turn off of the power, the operations of FIG. 5 are executed. If the power is turned on, at block 502, the system controller 52 determines whether the power failure occurrence time information is stored in the flash memory 53 or not. If the information is stored, the system controller 52 reads the power failure occurrence time information from the flash memory 53, hops other communication hubs by using the RF mesh device 48, and uploads the power failure occurrence time information to the server 106 together with power-on time (often referred to as power failure recovery time), in block 504. The system controller 52 clears the power failure occurrence time information in the flash memory 53 in block 506 and proceeds to the processing following block 402 in FIG. 4. Block 506 may also be omitted similarly to block 432.

The power of the communication hub is turned on at any time but is often turned off at the occurrence of power failure or the like. After that, when the power is turned on, if the power failure occurrence time information is stored in the flash memory 53, the server can certainly collect the power failure occurrence time information by reading, by the system controller 52, the information and transmitting, by the RF mesh device 48, the information to the server 106.

The above explanations relate to an example in which the power meter 10 and the communication hub 20 are configured separately, but both the functions may be accommodated in an integrated unit. FIG. 6 is a block diagram showing an example of a situation in which the electronic device of a modified example is connected to the network. The communication hub constitutes the RF mesh network in FIG. 1 but a smart meter 600 in which a power meter 602 and communication unit 604 are integrated constitutes an RF mesh network in FIG. 6. The connection between the smart meters and the Internet 620 is not limited to the connection in the RF mesh network, but smart meters 600 in condominiums and buildings may be connected to a concentrator 616 in a building via connection lines 630 and then connected to the Internet 620 via a power line 632.

The power failure occurrence time information is only written to the flash memory 53 but the server 106 is not notified of the information at the occurrence of power failure, in the above explanations. If the power of the super-capacitors 26 and 28 includes a margin, the server 106 may be notified of the information without awaiting the recovery from power failure. However, if there is a possibility of transmitting the data from the server 106 to the communication hub 20 side, transmission of the power failure occurrence time information to the server 106 may be awaited until the recovery from power failure to save the power of the super-capacitors 26 and 28 so as to be capable of receiving the data at the time of power failure. For example, firmware of the communication function of the communication hub 20 may be updated by the server 106. In this case, since the server 106 recognizes the power failure occurrence time information and the power failure recovery time information, the server 106 may retransmit the information on the assumption that the information transmitted from the server 106 during the power failure is not correctly received by the communication hub 20.

Furthermore, the smart meter serving as the power meter equipped with a communication function has been described as the embodiments but is not limited to this. An electronic device which is equipped with no battery and driven by a commercial power supply and which needs to notify an external device of the occurrence of power failure is similarly applicable.

Since the processing of the present embodiment can be implemented by the computer program, advantages similar to the advantages of the present embodiment can easily be obtained by merely installing the computer program in a computer via a computer-readable storage medium in which the computer program is stored and by merely executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device operable by a power supply voltage obtained from a power supply, comprising:
   a capacitor charged by the power supply voltage; and
   a circuitry that writes power failure occurrence time information to a nonvolatile memory using power of the capacitor after an occurrence of a power failure, reads the power failure occurrence time information from the nonvolatile memory, and transmits the power failure occurrence time information and identification information of the electronic device to an external device.

2. The electronic device of claim 1, wherein the circuitry transmits the power failure occurrence time information and the identification information to the external device upon recovery of a power after the occurrence of the power failure.

3. The electronic device of claim 1, wherein the circuitry transmits power failure recovery time information to the external device together with the power failure occurrence time information and the identification information.

4. The electronic device of claim 1, wherein the circuitry clears the power failure occurrence time information in the nonvolatile memory when the power failure occurrence time information is transmitted to the external device.

5. The electronic device of claim 1, wherein the circuitry transmits the power failure occurrence time information and the identification information to the external device using the power supply voltage at power-on.

6. A method of an electronic device operable by a power supply voltage obtained from a power supply, the electronic device comprising a nonvolatile memory and a capacitor charged by the power supply voltage, the method comprising:
  writing power failure occurrence time information to the nonvolatile memory using power of the capacitor after an occurrence of a power failure;
  reading the power failure occurrence time information from the nonvolatile memory; and
  transmitting the power failure occurrence time information and identification information of the electronic device to an external device.

7. The method of claim 6, wherein
  transmitting the power failure occurrence time information and the identification information comprises transmitting the power failure occurrence time information and the identification information to the external device upon recovery of a power after the occurrence of the power failure.

8. The method of claim 6, wherein transmitting the power failure occurrence time information and the identification information comprises transmitting power failure recovery time information to the external device together with the power failure occurrence time information and the identification information.

9. The method of claim 6, further comprising: clearing the power failure occurrence time information in the nonvolatile memory when the power failure occurrence time information is transmitted to the external device.

10. The method of claim 6, wherein transmitting the power failure occurrence time information and the identification information comprises transmitting the power failure occurrence time information to the external device using the power supply voltage at power-on.

11. An electronic device connectable to a power meter comprising a converter that is connected to a power supply and to convert a voltage of the power supply into an operation voltage, the electronic device comprising:
  a circuit element receives the operation voltage from the converter and holds the operation voltage for a first period after the occurrence of the power failure;
  a communication device configured to transmit power amount information received from the power meter to a server;
  a nonvolatile memory to which power failure occurrence time information is written after the occurrence of the power failure; and
  a controller that reads the power failure occurrence time information from the nonvolatile memory and notifies the server of the power failure occurrence time information and identification information of the electronic device by the communication device.

12. The electronic device of claim 11, wherein the circuit element comprises an electric double-layer capacitor.

13. The electronic device of claim 11, wherein
  the power amount information is wirelessly received from the power meter.

14. The electronic device of claim 13, wherein the communication device wirelessly transmits the power amount information, the identification information, and the power failure occurrence time information.

15. The electronic device of claim 14, wherein the communication device transmits the power amount information, the identification information, and the power failure occurrence time information to the server via a communication device of another electronic device.

16. The electronic device of claim 14, wherein the communication device comprises a transmitter using a cellular telephone line.

17. The electronic device of claim 11, wherein the nonvolatile memory stores the identification information of the electronic device.

18. The electronic device of claim 11, wherein the controller transmits the power failure occurrence time information and the identification information to the server upon recovery of a power after the occurrence of the power failure.

19. The electronic device of claim 11, wherein the controller transmits power failure recovery time information and the identification information to the server together with the power failure occurrence time information.

20. The electronic device of claim 11, wherein the controller reads the power failure occurrence time information from the nonvolatile memory, notifies the server of the power failure occurrence time information and the identification information by the communication device and clears the power failure occurrence time information in the nonvolatile memory.

* * * * *